(12) United States Patent
Münzmay et al.

(10) Patent No.: US 7,863,372 B2
(45) Date of Patent: Jan. 4, 2011

(54) AQUEOUS COPOLYMER DISPERSIONS WITH IMPROVED BLOCKING RESISTANCE

(75) Inventors: Thomas Münzmay, Dormagen (DE); Ulrich Freudenberg, Pulheim (DE); Christian Wamprecht, Neuss (DE); Christoph Irle, Sant Just Desvern (ES); Rolf Roschu, Willich (DE)

(73) Assignee: Bayer MaterialScience AG, Leverkusen (DE)

( * ) Notice: Subject to any disclaimer, the term of this patent is extended or adjusted under 35 U.S.C. 154(b) by 438 days.

(21) Appl. No.: 11/805,205

(22) Filed: May 22, 2007

(65) Prior Publication Data
US 2007/0282049 A1    Dec. 6, 2007

(30) Foreign Application Priority Data
May 30, 2006    (DE) .................. 10 2006 025 006

(51) Int. Cl.
*C08F 8/30*    (2006.01)
(52) U.S. Cl. ...................... 524/556; 525/123
(58) Field of Classification Search .............. 524/556; 525/79, 87, 123, 319, 328, 328.5
See application file for complete search history.

(56) References Cited

U.S. PATENT DOCUMENTS

| | | | | |
|---|---|---|---|---|
| 5,691,417 A | * | 11/1997 | Bremer et al. ............... | 525/123 |
| 5,969,054 A | * | 10/1999 | Wamprecht et al. ......... | 525/392 |
| 6,410,647 B1 | * | 6/2002 | Yoshioka et al. ............ | 525/166 |
| 6,656,531 B2 | * | 12/2003 | Yoshioka et al. ............ | 427/386 |
| 6,962,953 B2 | | 11/2005 | Probst et al. ................. | 524/505 |
| 7,001,975 B2 | * | 2/2006 | Bremser et al. ............... | 528/75 |
| 7,122,595 B1 | | 10/2006 | Ott et al. ...................... | 524/502 |
| 2003/0050385 A1 | | 3/2003 | Probst et al. ................. | 524/505 |
| 2004/0034164 A1 | * | 2/2004 | Melchiors et al. ............ | 524/608 |
| 2004/0234487 A1 | | 11/2004 | Bremser et al. .......... | 424/70.17 |
| 2004/0242741 A1 | * | 12/2004 | Wamprecht et al. ......... | 524/262 |
| 2006/0205857 A1 | * | 9/2006 | Hofacker et al. ............ | 524/457 |

OTHER PUBLICATIONS http://www.resins.com/resins/eu/pdf/vv-1-1.pdf.*

* cited by examiner

*Primary Examiner*—David Wu
*Assistant Examiner*—Vu A Nguyen
(74) *Attorney, Agent, or Firm*—Connolly Bove Lodge & Hutz LLP

(57) ABSTRACT

The invention relates to new, aqueous secondary copolymer dispersions, to a process for preparing them and to their use for producing high-grade coatings, especially for wood. The dispersions comprise a copolymer (P) synthesized from a mixture of free-radically polymerizable monomers (M) comprising (M1) cycloaliphatic esters of acrylic and/or methylacrylic acid and also (M2) vinyl esters of aliphatic carboxylic acids.

8 Claims, No Drawings

AQUEOUS COPOLYMER DISPERSIONS WITH IMPROVED BLOCKING RESISTANCE

CROSS-REFERENCE TO RELATED APPLICATION

This application claims priority under 35 U.S.C. §119 (a-d) to German application DE 10 2006 025 006.0, filed May 30, 2006.

FIELD OF THE INVENTION

The invention relates to new, aqueous secondary copolymer dispersions, to a process for preparing them and to their use for producing high-grade coatings, especially for wood.

BACKGROUND OF THE INVENTION

EP-A 358 979 discloses aqueous dispersions of hydroxy-functional copolymers, particularly those of the kind known as secondary dispersions, which have become established as particularly suitable polyol components for aqueous two-component (2K) polyurethane varnishes. These products have been found appropriate especially for the wood coating sector, since varnishes based on secondary copolymer dispersions are distinguished by particularly good grain attenuation of the wood. Aqueous (2K) polyurethane varnishes based on secondary copolymer dispersions, used as binders in application sectors which allow only room-temperature drying, such as for the varnishing of wood-block flooring, for example, on the other hand, require too long a time until the varnish reaches its full load-withstanding capacity. Critical parameters for the load-withstanding capacity are considered to include the drying time and the time until sufficient resistance to long-term loading is acquired, such loading being that produced, for example, by heavy pieces of furniture (known as blocking resistance).

EP-A 358 979, DE-A 42 262 70 and EP-A 1 024 184 describe aqueous (2K) polyurethane varnishes based on secondary vinyl polymer dispersions and polyisocyanate crosslinkers that already have a good level of properties. The vinyl polymers serve in this case as an emulsifier for the polyisocyanates and thereby prevent unwanted isocyanate-water reaction. A disadvantage of these systems, however, is their deficient drying rate, which is vital for applications in the field of the varnishing of wood-block flooring.

DE-A 44 39 669 describes aqueous two-component polyurethane coating materials based on water-dilutable polyacrylate resins and polyisocyanates, which are applied as clearcoat material over a basecoat film and are distinguished by rapid attainment of a dust-dry and tack-free state and also by rapid volume drying. The coating materials described therein are used in particular in the OEM finishing or refinishing of car bodies. A disadvantage of these systems is their inadequate blocking resistance, which rules out their use in the wood coating sector.

For the wood varnishing sector, therefore, there continues to be a need for suitable coating materials which can be processed to (2K) polyurethane varnishes with good film optical qualities, hardness and chemical and mechanical resistance and which at the same time possess a sufficient drying rate and blocking resistance.

SUMMARY OF THE INVENTION

It was an object of the present invention, therefore, to provide aqueous, hydroxy-functional secondary copolymer dispersions and the aqueous (2K) polyurethane varnishes preparable from them and exhibiting rapid drying and improved blocking resistance while at the same time retaining the effective grain attenuation.

Surprisingly it has now been found that aqueous secondary dispersions based on hydroxyl-functional copolymers (P) which contain structural units not only of monomers of the acrylic and/or methacrylic esters of cycloaliphatic alcohols but also of monomers of aliphatic vinyl esters overcome the disadvantages of the prior art. The resulting coatings combine very effective wood grain attenuation with rapid drying and early blocking resistance.

The invention accordingly provides aqueous secondary copolymer dispersions comprising a copolymer (P) synthesized from a mixture of free-radically polymerizable monomers (M) comprising (M1) cycloaliphatic esters of acrylic and/or methylacrylic acid and also (M2) vinyl esters of aliphatic carboxylic acids.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The copolymers (P) on which the aqueous secondary dispersions of the invention are based are prepared by free-radical polymerization of olefinically unsaturated monomers (M1) to (M6) using free-radical initiators (I) in a multi-stage process. Monomers suitable for preparing the copolymers (P) include, in addition to the monomers (M1) and (M2), the following monomers:

(M3) hydroxy-functional, free-radically polymerizable monomers, (M4) carboxyl-functional, free-radically polymerizable monomers, (M5) hydroxyl- and carboxyl-free (meth)acrylic esters with $C_1$-$C_{18}$ hydrocarbon radicals in the alcohol moiety and/or vinylaromatics, and (M6) optionally further monomers, different from (M1) to (M5).

Preferably the copolymers (P) are synthesized from monomers (M) selected from the group containing (M1) 10% to 30% by weight, preferably 12.5% to 20% by weight, of cycloaliphatic esters of acrylic acid and/or methacrylic acid or mixtures thereof, (M2) 7.5% to 40% by weight, preferably 10% to 30% by weight, of vinyl esters of aliphatic carboxylic acids, (M3) 14% to 36% by weight, preferably 15% to 30% by weight, of hydroxy-functional, free-radically polymerizable monomers, (M4) 1% to 4.5% by weight, preferably 2% to 3.5% by weight, of carboxyl-functional, free-radically polymerizable monomers, (M5) 18% to 62% by weight, preferably 20% to 50% by weight, of hydroxyl- and carboxyl-free (meth)acrylic esters having C1 to C18 hydrocarbon radicals in the alcohol moiety and/or vinylaromatics, (M6) 0% to 40% by weight of further monomers, different from (M1) to (M5), the copolymers (P) containing 22.5% to 50% by weight, preferably 22.5% to 35% by weight, of monomer units (M1) plus (M2), and the sums of components (M1) to (M6) adding up to 100% by weight.

For the purposes of the present invention, acrylic acid or methacrylic acid are also defined as (meth)acrylic acid.

Suitable monomers (M1) are, for example, cyclohexyl (meth)acrylate, cyclohexyl (meth)acrylates ring-substituted with alkyl groups, 4-tert-butylcyclohexyl (meth)acrylate, norbornyl (meth)acrylate, isobornyl (meth)acrylate, preference being given to isobornyl acrylate and/or isobornyl methacrylate, and particular preference to isobornyl methacrylate. It is also possible to use mixtures comprising isobornyl acrylate and isobornyl methacrylate and other monomers (M1). The monomers (M1) other than isobornyl acrylate and isobornyl methacrylate may optionally be used in amounts of less than 10% by weight, based on the sum of (M1) to (M5).

Suitable monomers (M2) are the esterification products of vinyl alcohol with linear or branched, aliphatic carboxylic acids such as, for example, vinyl acetate, vinyl propionate, vinyl butyrate, vinyl 2-ethylhexanoate, vinyl octanoate, vinyl decanoate, vinyl dodecanoate (vinyl laurate) or vinyl stearate. Preferred are the vinyl esters of branched, aliphatic carboxylic acids of the general formula (I)

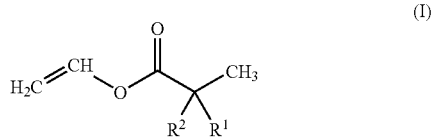

in which $R^1$ and $R^2$ are saturated alkyl groups, containing together 6, 7 or 8 carbon atoms, corresponding to the compounds VeoVa® 9, 10 and 11.

As monomers (M2) it is preferred to use the vinyl monomers available commercially as VeoVa® Monomer 9, 10 and 11 (Hexion Specialty Chemicals B.V., Rotterdam, NL), with VeoVa® Monomer 9 being particularly preferred.

The stated monomers differ in terms of the glass transition temperature of their homopolymers:

| Monomer | $T_g$ [° C.] |
|---|---|
| VeoVa ® 9 | +70 |
| VeoVa ® 10 | −3 |
| VeoVa ® 11 | −40 |

Suitable hydroxyl-functional monomers (M3) include ethylenically unsaturated, hydroxyl-containing monomers, such as hydroxyalkyl esters of unsaturated carboxylic acids, preferably hydroxyalkyl (meth)acrylates having 2 to 12, preferably 2 to 6, carbon atoms in the hydroxyalkyl radical. Examples of particularly preferred compounds are 2-hydroxyethyl (meth)acrylate, the isomeric hydroxypropyl (meth)acrylates, 2-, 3- and 4-hydroxybutyl (meth)acrylates, and the isomeric hydroxyhexyl (meth)acrylates.

Suitable carboxyl-functional free-radically polymerizable monomers (M4) are olefinically unsaturated monomers containing carboxylic acid or carboxylic anhydride groups, such as acrylic acid, methacrylic acid, β-carboxyethyl acrylate, crotonic acid, fumaric acid, maleic anhydride, itaconic acid or monoalkyl esters of dibasic acids or anhydrides, such as maleic acid monoalkyl esters, for example. Acrylic acid and/or methacrylic acid are preferred.

Hydroxyl- and carboxyl-free monomers (M5) employed are acrylates and methacrylates having 1 to 18 carbon atoms in the alcohol moiety of the ester group. The alcohol moiety is preferably aliphatic and may be linear or branched. Examples of suitable monomers of component (M5) are methyl, ethyl, n-propyl, isopropyl, n-butyl, isobutyl, tert-butyl, the isomeric pentyl, hexyl, 2-ethylhexyl, octyl, dodecyl, hexadecyl and octadecyl (meth)acrylates. Particularly suitable vinylaromatics are styrene, optionally substituted styrenes and vinyltoluenes. Preferred monomers (M5) are methyl, n-butyl, isobutyl, tert-butyl (meth)acrylate and also 2-ethylhexyl acrylate and styrene.

Suitable monomers (M6) are acetoacetoxyethyl methacrylate, acrylamide, acrylonitrile, vinyl ethers, methacrylonitrile or vinyl acetates. In addition it is possible to make use, proportionally, of monofunctional polyalkylene oxides having molecular weights of 200 to 3000 g/mol, preferably 350 to 1000 g/mol, or esterified (meth)acrylic acid, which are suitable as nonionic, hydrophilic groups. Suitable alkylene oxides include, preferably, ethylene oxide or mixtures of ethylene oxide and propylene oxide. Preferably, however, the hydrophilicization of the copolymers takes place by ionic groups means monomers (M4).

The proportions of the synthesis components (M1) to (M6) are chosen such that the copolymer (P) has an OH number of 35 to 200 mg KOH/g, preferably of 50 to 125 mg KOH/g solids and an acid number of 10 to 50 mg KOH/g, preferably 15 to 30 mg KOH/g solids.

The preparation of the copolymer (P) can in principle be carried out by means of conventional free-radical polymerization processes in organic phase. The copolymer (P) is preferably prepared in a multi-stage operation of the kind already described in EP-A 0 947 557 (p. 31.2-p. 41.15) or in EP-A 1 024 184 (p. 21.53-p. 41.9). In this operation first a hydrophobic monomer mixture (MI), free from acid groups or with a low acid group content, is metered in, and then, at a later point in time in the polymerization, a more hydrophilic monomer mixture (MII), containing acid groups, is metered in, the more hydrophilic monomer mixture (MII) containing acid groups containing no monomers of type (M1) and (M2).

Accordingly the present invention likewise provides a process for preparing the aqueous secondary copolymer dispersions of the invention, characterized in that in a first step a hydrophobic monomer mixture M(I) containing the monomers (M1) 16.5% to 33.5% by weight, (M2) 12.5% to 44.5% by weight, (M3) 10% to 35% by weight, (M4) 0% to 2.5% by weight, (M5) 10% to 61% by weight and (M6) 0% to 40% by weight is polymerized and subsequently in a second stage the polymer obtained is admixed with a hydrophilic monomer mixture M(II) containing the monomers (M3) 20% to 60% by weight, (M4) 10% to 45% by weight, (M5) 30% to 70% by weight and (M6) 0% to 40% by weight and the components are reacted to a copolymer (P), and the resultant copolymer (P), containing acid groups, is transferred to the aqueous phase, at least 40 mol % of the carboxyl groups being neutralized before or during dispersion.

In a further embodiment of the process of the invention, in a first step, a mixture (V) composed of 30% to 70% by weight of one or more monomers (M2) and 70% to 30% by weight of an organic solvent are charged to a reactor, subsequently in a second step a hydrophobic monomer mixture M(I) containing the monomers (M1) 22.5% to 36.5% by weight, (M2) 0% to 33.5% by weight, (M3) 10% to 35% by weight, (M4) 0% to 2.5% by weight, (M5) 10% to 67.5% by weight and (M6) 0% to 40% by weight is polymerized and subsequently in a further stage the resulting polymer is admixed with a hydrophilic monomer mixture M(II) containing the monomers (M3) 20% to 60% by weight, (M4) 10% to 45% by weight, (M5) 30% to 70% by weight and (M6) 0% to 40% by weight, and the components are reacted to a copolymer (P), and the resultant copolymer (P), containing acid groups, is transferred to the aqueous phase, at least 25 mol % of the carboxyl groups being neutralized before or during dispersion.

The copolymerization is carried out in general at 40 to 180° C., preferably at 80 to 160° C. Suitable initiators (I) for the polymerization reaction include organic peroxides such as di-tert-butyl peroxide, for example, or tert-butyl peroxy-2-ethylhexanoate and azo compounds. The initiator quantities employed depend on the desired molecular weight. For reasons of operational reliability and of greater ease of handling it is also possible to use peroxide initiators in the form of a solution in suitable organic solvents of the type already specified.

The rate of addition of the initiator (I) in the process of the invention is controlled such that it lasts until the end of the monomer feed (M), and the solvent quantities in steps one and two are chosen so as to result in an organic solvent content of less than 12% by weight.

The amounts of the ingredients are preferably calculated so as to result in a mass ratio (V):(M) of 1:9 to 3:7 and (M1):(MII) of 9:1 to 6:4, with particular preference a mass ratio (V):(M) of 1.2:8.8 to 2:8 and (MI):(MII) of 8.5:11.5 to 7:3.

The free-radical polymerization can be carried out in the presence of a solvent or solvent/water mixture which is charged to the reaction vessel. Suitable organic solvents include any solvents that are known in paint technology, preference being given to those which are typically used as cosolvents in aqueous dispersions, such as alcohols, ethers, alcohols containing ether groups, esters, ketones or non-polar hydrocarbons, for example, or mixtures of these solvents. The solvents are used in amounts such that their level in the completed dispersion is 0% to 12% by weight, preferably 2% to 8% by weight.

It is further preferred to prepare the copolymer by the process of EP-A 1 024 184, using a hydrophobic copolymer as the initial charge.

Preference is thus given to a process for preparing copolymers (P) that comprises the steps of:

A) charging a reaction vessel with a hydroxy-functional hydrophobic copolymer having an acid number <10 mg KOH/g, an OH content of 0.5% to 7% (based in each case on resin in 100% form), a number-average molecular weight $M_n$ of 1500 Dalton to 20 000 Dalton, optionally in solution in an organic solvent, B) carrying out preliminary metering of a free-radical initiator, optionally in solution in an organic solvent, into the same reaction vessel, in an amount of 5% to 40% of the total amount of initiator B used, C) polymerizing a hydrophobic, OH-containing monomer mixture in this reaction vessel or in this reaction mixture, and D) polymerizing a hydrophilic monomer mixture, containing OH groups and acid groups, in this reaction vessel or in this reaction mixture, at least 60% of the acid groups installed in total being introduced into the copolymer P, characterized in that the copolymer P has an average molecular weight $M_n$ of 3000 to 7000, an average molecular weight $M_w$ of 10 000 Dalton to 25 000 Dalton and a molecular weight distribution $M_w/M_n$ of 2.5 to 4.0, and has a hydroxyl group content of 1% to 8%, the acid number of the copolymer P in 100% form being 12 to 30 mg KOH/g.

Instead of a multi-stage polymerization process it is likewise possible to carry out the process of the invention continuously (gradient polymerization), i.e. a monomer mixture is added with a changing composition, the hydrophilic (acid-functional) monomer fractions being higher towards the end of the feed than at the beginning.

The number-average molecular weight Mn of the copolymers (P) can be controlled through a specific choice of the operating parameters, such as of the molar monomer/initiator ratio, for example, of the reaction time or of the temperature, and is situated in general at between 500 Dalton and 30 000 Dalton, preferably between 1000 Dalton and 15 000 Dalton, more preferably between 1500 Dalton and 10 000 Dalton. The hydroxyl group content of the copolymers (P) in 100% form is preferably 1% to 5% by weight, preferably 1.5% to 4.5% by weight and with particular preference 1.75% to 3.5% by weight.

Before, during or after the dispersion of the copolymers (P) in water, the acid groups present are converted at least proportionally into their salt form by addition of suitable neutralizing agents. Suitable neutralizing agents are organic amines or water-soluble inorganic bases, such as soluble metal hydroxides, metal carbonates or metal hydrogen carbonates, for example, such as sodium hydroxide or potassium hydroxide, for example.

Examples of suitable amines are N-methylmorpholine, triethylamine, ethyldiisopropylamine, N,N-dimethylethanolamine, N,N-dimethyl-isopropanolamine, N-methyldiethanolamine, diethylethanolamine, triethanolamine, butanolamine, morpholine, 2-aminomethyl-2-methylpropanol or isophoronediamine. In mixtures it is also possible, proportionally, to use ammonia. Particularly preferred are triethanolamine, N,N-dimethylethanolamine and ethyldiisopropylamine.

The neutralizing agents are added in amounts such that in total the theoretical degree of neutralization [of the acid groups] is from 40% to 150%, preferably 60% to 120%. The degree of neutralization here is the ratio of added basic groups of the neutralizing component to acid functions of the copolymer. The pH of the aqueous copolymer dispersion of the invention is 6 to 10, preferably 6.5 to 9.

The copolymer dispersions of the invention are particularly suitable as binders for aqueous two-component (2K) polyurethane coating materials in combination with suitable crosslinkers (X).

The invention further provides aqueous two-component polyurethane coating materials comprising binders based on the aqueous secondary dispersions of the invention and on crosslinkers (X) containing isocyanate groups.

Crosslinkers (X) used are preferably polyisocyanates. Such polyisocyanates have two or more NCO groups per molecule and are based for example on isophorone diisocyanate, hexamethylene diisocyanate, 1,4-diisocyanatocyclohexane, bis(4-isocyanatocyclohexane)methane, 1,3-diisocyanatobenzene, triisocyanatononane or the isomeric 2,4- and 2,6-TDI, and may further contain urethane, isocyanurate and/or biuret groups. Optionally the polyisocyanates may also be blocked.

Particular preference is given to the use of low-viscosity polyisocyanates of the abovementioned kind, based on aliphatic or cycloaliphatic isocyanates. Optionally these may also be hydrophilicized.

The polyisocyanates used as crosslinkers generally have a viscosity at 23° C. of 10 to 5000 mPas and may also be employed, if desired in order to adjust viscosity, in a blend with small amounts of inert solvents.

The copolymers of the invention are generally hydrophilic enough that even hydrophobic crosslinker resins can be dispersed without additional emulsifieres. However, this is not to rule out the use of external emulsifiers.

Water-soluble or dispersible polyisocyanates are obtainable for example by modification of carboxylate, sulphonate and/or polyethylene oxide groups and/or polyethylene oxide/polypropylene oxide groups. The polyisocyanates can be made hydrophilic by means for example of reaction with substoichiometric amounts of monohydric, hydrophilic polyether alcohols. The preparation of hydrophilicized polyisocyanates of this kind is described for example in EP-A 0 540 985 (p. 3, 1.55 to p. 4, 1.5). Also highly suitable are the polyisocyanates containing allophanate groups that are described in EP-A 959 087 (p. 3, 1.39 to 51), which are prepared by reacting low-monomer-content polyisocyanates with polyethylene oxide polyether alcohols under allophanatization conditions. Also suitable are the water-dispersible polyisocyanate mixtures described in DE-A 100 078 21 (p. 2, 1.66 to p. 31.5), which are based on triisocyanatononane. Of particular suitability and preference are polyisocyanates hydrophilicized with ionic groups, especially sulphonate groups, of the kind described in DE-A 100 24 624 (p. 3 11.13 to 33), for example.

Also possible in principle, of course, is the use of mixtures of different crosslinker resins.

The ratio of the hydroxyl groups of the binder component to the isocyanate groups of the crosslinker (X) is typically 3:1 to 1:5, preferably 2:1 to 1:3 and with particular preference 1:1 to 1:2.

The coating materials comprising the aqueous secondary dispersions of the invention can be applied to any desired substrates, examples being wood, metal, plastic, paper, leather, textiles, felt, glass or mineral substrates, and also the substrates which have already been coated. One particularly preferred application is the use of the aqueous coating materials for producing coatings on absorbent substrates such as wood or open-pored, mineral substrates, for example. A preferred substrate is wood.

Likewise provided for the present invention are articles of wood, coated with coating materials comprising the aqueous secondary dispersions of the invention.

The coating materials can be used as they are or in combination with further auxiliaries and adjuvants known from coating technology, such as fillers and pigments, for example.

The coating materials comprising the secondary dispersions of the invention can be applied in known ways, such as by spreading, pouring, knifecoating, injecting, spraying, spincoating, rolling or dipping, for example.

EXAMPLES

Chemicals

Bayhydur® XP 2487/1 (Bayer MaterialScience AG, Leverkusen)
Byk® 024 (Byk Chemie, Wesel)
Dowanol®PnB (Dow Deutschland, Schwalbach/Taunus)
Dowanol®PMA (Dow Deutschland, Schwalbach/Taunus)
Peroxan® DB (PERGAN, Bocholt)
VeoVa® 9 (Hexion Specialty Chemicals B.V., Rotterdam, NL)

Test Specifications

Drying time: The 2K clear varnishes of Table 3 are applied to glass plates using a doctor knife in a wet film thickness of 240 μm. The coated glass plates are stored in horizontal position at 25° C. and 55% relative humidity. The tack-free time is tested by pressing into the varnish film with the (index) finger. The tack-free time is designated the point in time at which the finger no longer leaves a permanently visible impression.

Blocking: The 2K clear varnishes of Table 3 are applied by spraying (low-pressure application) to plywood plaques measuring 6 cm×6 cm. After 15 minutes of flashing-off at 25° C. and 55% relative humidity, the varnishes are cured at 40° C. for 3 hours. The varnished wooden plaques are then placed in pairs with the varnish films against one another, and are stored under a 3.6 kg weight load at 60° C. for one hour. After cooling to room temperature, the separability of the two varnish films is tested.

Evaluation: 0=complete bonding of the varnish surfaces (coalescence) of the varnish films; 5=no blocking Preparation Instructions (Parts as Per Table):

Part I was charged to a 10 L reactor with stirrer, reflux condenser, temperature measurement and monomer feed apparatus (dropping funnel) and blanketed with a gentle stream of nitrogen for one hour. This initial charge was then heated to 148° C. with stirring. After it had reached the temperature, it was admixed with part II over the course of 20 minutes. Immediately thereafter, in parallel, parts III and IV were metered in over 4.5 hours optionally with cooling so that the temperature did not exceed 153° C. Following complete addition, the batch was held at 148° C. for 0.5 hours. Then parts V and VI were metered in over 1.5 hours. The batch was then maintained at 148° C. for an hour before being cooled to 100° C. and admixed with part VII. After a further 0.5 hours of homogenization, water with a temperature of 60° C. (part VIII) was used to carry out dispersion over the course of 0.5 hours, followed by stirring at 80° C. for 2 hours and discharge through filters.

TABLE 1 inventive polymer dispersions in comparison to non-inventive dispersions (comparative)

| | Example | | | | | | |
|---|---|---|---|---|---|---|---|
| | inventive 1 | comparative 2 | comparative 3 | inventive 4 | inventive 5 | comparative 6 | inventive 7 |
| Part I: VeoVa ® 9 | 457.0 g | 457.0 g | 457.0 g | 457.0 g | 457.0 g | 228.5 g | 295.0 |
| Dowanol ® PnB | 208.0 g | 208.0 g | 208.0 g | 208.0 g | 208.0 g | 213.0 g | 295.0 |
| Part II: Peroxan ® DB | 12.0 g | 12.0 g | 12.0 g | 12.0 g | 12.0 g | 12.0 g | |
| Dowanol ® PnB | 12.0 g | 12.0 g | 12.0 g | 12.0 g | 12.0 g | 12.0 g | |
| Part III: Styrene | 359.0 g | 359.0 g | 359.0 g | 359.0 g | 208.0 g | 775.0 g | 166.0 |
| HEMA[a] | 377.0 g | 377.0 g | 377.0 g | 377.0 g | 584.5 g | 540.0 g | 505.0 |
| MMA[b] | 1042.0 g | 1042.0 g | 1078.0 g | 1042.0 g | 571.5 g | 1165.5 g | 466.0 |
| nBA[c] | 336.0 g | | | 336.0 g | 124.5 g | 228.5 g | 99.0 |
| iBoMA[d] | 370.0 g | | | | 555.0 g | | 442.5 |
| nBMA[e] | | 706.0 g | | 706.0 g | 441.0 g | | 381.0 |
| CHMA[f] | | | 334.0 g | | | | |
| Part IV: Peroxan ® DB | 43.0 g | 43.0 g | 43.0 g | 43.0 g | 43.0 g | 43.0 g | 34.3 |
| Dowanol ® PnB | 53.0 g | 53.0 g | 53.0 g | 53.0 g | 53.0 g | 53.0 g | 34.3 |
| Part V: HEMA[a] | 189.0 g | 189.0 g | 189.0 g | 189.0 g | 278.0 g | 266.5 g | 212.0 |
| MMA[b] | 266.0 g | 266.0 g | 266.0 g | 266.0 g | 178.0 g | 188.5 g | 132.5 |
| n-BA[c] | 148.0 g | 148.0 g | 148.0 g | 148.0 g | 148.0 g | 148.0 g | 118.0 |
| Acrylic acid | 88.5 g | 88.5 g | 88.5 g | 88.5 g | 88.5 g | 88.5 g | 88.5 |

TABLE 1-continued inventive polymer dispersions in comparison to non-inventive dispersions (comparative)

| | Example | | | | | | |
|---|---|---|---|---|---|---|---|
| | inventive 1 | comparative 2 | comparative 3 | inventive 4 | inventive 5 | comparative 6 | inventive 7 |
| Part VI: Peroxan ® DB | 12.0 g | 12.0 g | 12.0 g | 12.0 g | 12.0 g | 12.0 g | 9.6 |
| Dowanol ® PnB | 27.0 g | 27.0 g | 27.0 g | 27.0 g | 27.0 g | 27.0 g | 21 |
| Part VII: N,N-DMEA | 115.4 g | 115.4 g | 115.4 g | 115.4 g | 144.0 g | 115.4 g | 115.4 |
| Part VIII: Water | 3595.0 g | 3595.0 g | 3595.0 g | 3595.0 g | 3565.0 g | 3595.0 g | 3960.0 |
| Solids [wt %] | 48.0 | 47.6 | 47.4 | 47.8 | 44.2 | 49.5 | 40.8 |
| Solvent content [wt %] | 3.8 | 3.8 | 3.8 | 3.9 | 3.6 | 4.0 | 4.8 |
| OH—N [mg KOH/g] | 66 | 66 | 66 | 66 | 99 | 99 | 99 |
| Acid number [mg KOH/g] | 19.7 | 19.4 | 19.6 | 19.5 | 19.6 | 20.0 | 24.6 |
| $T_g$ [° C.]$_{calc.}$ | 65 | 64 | 59 | 78 | 66 | 66 | 116 |

[a] hydroxyethyl methacrylate;
[b] methyl methacrylate;
[c] n-butyl acrylate;
[d] isobornyl methacrylate;
[e] n-butyl methacrylate;
[f] cyclohexyl methacrylate

TABLE 2

Gross composition of monomer types

| | Example | | | | | | | |
|---|---|---|---|---|---|---|---|---|
| | 1 inventive | 2 comparative | 3 comparative | 4 inventive | 5 inventive | 6 comparative | 7 inventive | 8 DE 102 37 576 Example 6 |
| (M 1) | 10.2 | 0 | 9.2 | 19.7 | 15.3 | 14.3 | 15.0 | 17.9 |
| (M 2) | 12.6 | 12.6 | 12.6 | 12.6 | 12.6 | 6.3 | 10.0 | 0.0 |
| (M 3) | 15.6 | 15.6 | 15.6 | 15.6 | 23.8 | 22.2 | 24.3 | 30.6 |
| (M 4) | 2.4 | 2.4 | 2.4 | 2.4 | 2.4 | 2.4 | 3.0 | 3.1 |
| (M 5) | 58.3 | 68.5 | 60.2 | 50.0 | 45.9 | 69.1 | 46.2 | 48.4 |
| (M 6) | 0.0 | 0.0 | 0.0 | 0.0 | 0.0 | 0.0 | 0.0 | 0.0 |

TABLE 3

Performance testing

| | inventive | comparative | comparative | inventive | inventive | comparative | inventive | DE 102 37 576 Example 6 |
|---|---|---|---|---|---|---|---|---|
| Example 1 | 52.7 g | | | | | | | |
| Example 2 | | 53.1 g | | | | | | |
| Example 3 | | | 53.4 g | | | | | |
| Example 4 | | | | 52.9 g | | | | |
| Example 5 | | | | | 56.2 g | | | |
| Example 6 | | | | | | 50.1 g | | |
| Example 7 | | | | | | | 60.9 g | |
| Example 8 | | | | | | | | 55.2 g |
| Byk 024 | 1.0 g | 1.0 g | 1.0 g | 1.0 g | 1.0 g | 1.0 g | 1.0 g | 1.0 g |
| Water | 24.3 g | 23.9 g | 23.6 g | 24.1 g | 26.3 g | 32.4 g | 21.6 g | 27.3 g |
| Bayhydur ® XP 2487/1 (80% in Dowanol ® PMA) | 10.5 g | 10.5 g | 10.5 g | 10.5 g | 15.8 g | 15.8 g | 15.8 g | 15.8 g |
| Drying tack-free time [h] | 2.0 | 2.0 | 2.5 | 2.0 | 1.5 | 1.5 | 2.0 | >6 |
| Blocking[a] | 5 | 1 | 1 | 4 | 5 | 0 | 4 | 0 |

[a] 0 = coalescence, 5 = no blocking

Example 9

A. Preliminary Stage

Part I was charged to a 10 L reactor with stirrer, reflux condenser, temperature measurement and monomer feed apparatus (dropping funnel) and blanketed with a gentle stream of nitrogen for 1 hour. The batch was then heated to 148° C. with stirring. After the temperature had been reached, part II was added over the course of 20 minutes. Immediately thereafter, in parallel, parts III and IV were metered in over 4.5 hours optionally with cooling so that the temperature did not exceed 153° C. Following complete addition, the batch was held at 148° C. for 1 hour. Cooling gives a high-viscosity resin with 68.5±1% by weight solids content.

| Part I: | Dowanol ® PnB | 3438 g |
| --- | --- | --- |
| Part II: | Peroxan ® DB | 33 g |
| | Dowanol ® PnB | 33 g |
| Part III: | methyl methacrylate | 1612 g |
| | n-butyl acrylate | 403 g |
| | n-butyl methacrylate | 2014 g |
| | VeoVa ® 9 | 4029 g |
| Part IV: | Peroxan ® DB | 118 g |
| | Dowanol ® PnB | 321 g |

B. Copolymer Dispersion

Part I was charged to a 30 L reactor with stirrer, reflux condenser, temperature measurement and monomer feed apparatus (dropping funnel) and blanketed with a gentle stream of nitrogen for 1 hour. The batch was then heated to 148° C. with stirring. After the temperature had been reached, part II was added over the course of 20 minutes. Immediately thereafter, in parallel, parts III and IV were metered in over 4.5 hours optionally with cooling so that the temperature did not exceed 153° C. Following complete addition, the batch was held at 148° C. for 0.5 hours. Subsequently parts V and VI were metered in over 1.5 hours. Subsequently the batch was held at 148° C. for an hour, then cooled to 100° C., and part VII was added. After a further 0.5 hours of homogenization, water with a temperature of 60° C. (part VIII) was used to carry out dispersion over the course of 0.5 hours, followed by stirring at 80° C. for 2 hours and discharge through filters.

The resulting dispersion had a solids content of 39.6% by weight, an average particle size of 105 nm, a solvent content of 3.2% by weight, a hydroxyl number of 99 mg KOH/g based on solids, and an acid number of 25 mg KOH/g based on solids.

| Part I: | Preliminary stage A | 1994 g |
| --- | --- | --- |
| Part II: | Peroxan ® DB | 36 g |
| | Dowanol ® PnB | 36 g |
| Part III: | VeoVa ® 9 | 702 g |
| | Styrene | 620 g |
| | methyl methacrylate | 1442 g |
| | hydroxyethyl methacrylate | 1748 g |
| | n-butyl acrylate | 305 g |
| | isobornyl methacrylate | 1659 g |
| | n-butyl methacrylate | 984 g |
| Part IV: | Peroxan ® DB | 129 g |
| | Dowanol ® PnB | 154 g |
| Part V: | methyl methacrylate | 499 g |
| | hydroxyethyl methacrylate | 799 g |
| | n-butyl acrylate | 444 g |
| | acrylic acid | 333 g |
| Part VI: | Peroxan ® DB | 36 g |
| | Dowanol ® PnB | 80 g |
| Part VII: | dimethylethanolamine | 432 g |
| Part VIII: | distilled water | 14 642 g |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Aqueous secondary copolymer dispersions comprising a copolymer (P) synthesized from a mixture of free-radically polymerizable monomers (M) comprising M1 and M2, and, optionally, M3, M4, M5 and M6, wherein (M1) are cycloaliphatic esters of acrylic and/or methylacrylic acid, (M2) are vinyl esters of branched, aliphatic carboxylic acids of formula (I)

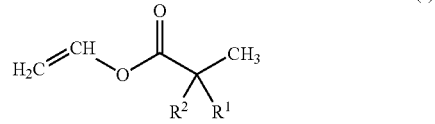

(I)

wherein $R^1$ and $R^2$ are saturated alkyl groups containing together 6, 7, or 8 carbon atoms (M3) are hydroxy-functional, free-radically polymerizable monomers, (M4) are carboxyl-functional, free-radically polymerizable monomers, (M5) are hydroxyl- and carboxyl-free (meth)acrylic esters having C1 to C18 hydrocarbon radicals in the alcohol moiety and/or vinylaromatics, and (M6) are monomers different from (M1) to (M5);

wherein said copolymer (P) has an OH number of 35 to 200 mg KOH/g solids and an acid number of 10 to 50 mg KOH/g solids.

2. Aqueous secondary copolymer dispersions according to claim 1, wherein copolymers (P) are synthesized from monomers (M) selected from the group containing (M1) 10% to 30% by weight of cycloaliphatic esters of acrylic acid and/or methacrylic acid or mixtures thereof, (M2) 7.5% to 40% by weight of vinyl esters of branched, aliphatic carboxylic acids of formula (I)

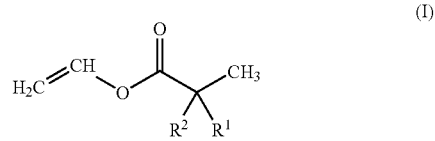

(I)

wherein $R^1$ and $R^2$ are saturated alkyl groups containing together 6, 7, or 8 carbon atoms, (M3) 14% to 36% by weight of hydroxy-functional, free-radically polymerizable monomers, (M4) 1% to 4.5% by weight of carboxyl-functional, free-radically polymerizable monomers, (M5) 18% to 62% by weight of hydroxyl- and carboxyl-free (meth)acrylic esters having C1 to C18 hydrocarbon radicals in the alcohol moiety and/or vinylaromatics, (M6) 0% to 40% by weight of further monomers, different from (M1) to (M5), the copolymers (P) containing 22.5% to 50% by weight of monomer units (M1) plus (M2), and the sums of components (M1) to (M6) adding up to 100% by weight.

3. Process for preparing aqueous secondary copolymer dispersions according to claim 1, wherein in a first step a hydrophobic monomer mixture M(I) comprising the monomers (M1) 16.5% to 33.5% by weight, (M2) 12.5% to 44.5% by weight, and further comprising the monomers (M3) 10% to 35% by weight, (M4) 0% to 2.5% by weight, (M5) 10% to 61% by weight and (M6) 0% to 40% by weight is polymerized and subsequently in a second stage the polymer obtained is admixed with a hydrophilic monomer mixture M(II) containing the monomers
- (M3) 20% to 60% by weight,
- (M4) 10% to 45% by weight,
- (M5) 30% to 70% by weight and
- (M6) 0% to 40% by weight and the components are reacted to a copolymer (P), and the resultant copolymer (P), containing acid groups, is transferred to the aqueous phase, at least 40 mol % of the carboxyl groups being neutralized before or during dispersion.

4. Process for preparing aqueous secondary copolymer dispersions according to claim 1, wherein
in a first step a mixture (V) composed of
- 30% to 70% by weight of one or more monomers (M2) and
- 70% to 30% by weight of an organic solvent are charged to a reactor,
subsequently in a second step a hydrophobic monomer mixture M(I) comprising the monomers
- (M1) 22.5% to 36.5% by weight,
- (M2) 0% to 33.5% by weight, and further comprising the monomers
- (M3) 10% to 35% by weight,
- (M4) 0% to 2.5% by weight,
- (M5) 10% to 67.5% by weight and
- (M6) 0% to 40% by weight is polymerized and subsequently in a further stage the resulting polymer is admixed with a hydrophilic monomer mixture M(II) containing the monomers
- (M3) 20% to 60% by weight,
- (M4) 10% to 45% by weight,
- (M5) 30% to 70% by weight and
- (M6) 0% to 40% by weight, and the components are reacted to a copolymer (P), and the resultant copolymer (P), containing acid groups, is transferred to the aqueous phase, at least 25 mol % of the carboxyl groups being neutralized before or during dispersion.

5. Aqueous two-component polyurethane coating materials comprising binders based on aqueous secondary copolymer dispersions according to claim 1 and crosslinkers (X).

6. Aqueous two-component polyurethane coating materials comprising binders based on aqueous secondary copolymer dispersions according to claim 1 and crosslinkers (X) containing isocyanate groups.

7. Aqueous two-component polyurethane coating materials according to claim 6, wherein crosslinkers (X) are polyisocyanates.

8. Articles of wood, coated with coating materials comprising aqueous secondary, copolymer dispersions according to claim 1.

* * * * *